United States Patent
Ohmori (10) Patent No.: US 11,230,205 B2
(45) Date of Patent: Jan. 25, 2022

(54) VEHICULAR POWER SUPPLY SYSTEM, AND MANAGEMENT DEVICE

(71) Applicant: Panasonic Intellectual Property Management Co., Ltd., Osaka (JP)

(72) Inventor: Chikara Ohmori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 30 days.

(21) Appl. No.: 16/638,964

(22) PCT Filed: Dec. 21, 2018

(86) PCT No.: PCT/JP2018/047168
§ 371 (c)(1),
(2) Date: Feb. 13, 2020

(87) PCT Pub. No.: WO2019/150836
PCT Pub. Date: Aug. 8, 2019

(65) Prior Publication Data
US 2020/0361337 A1     Nov. 19, 2020

(30) Foreign Application Priority Data

Jan. 30, 2018  (JP) .............................. JP2018-013406

(51) Int. Cl.
*H02J 7/00*    (2006.01)
*B60L 58/12*   (2019.01)
*B60L 50/70*   (2019.01)

(52) U.S. Cl.
CPC ............... *B60L 58/12* (2019.02); *B60L 50/70* (2019.02)

(58) Field of Classification Search
None
See application file for complete search history.

(56) References Cited

U.S. PATENT DOCUMENTS

| | | | | |
|---|---|---|---|---|
| 5,825,155 A | * | 10/1998 | Ito | H02J 7/0063 320/118 |
| 6,275,004 B1 | * | 8/2001 | Tamai | B60K 6/485 320/118 |

(Continued)

FOREIGN PATENT DOCUMENTS

| | | |
|---|---|---|
| JP | 2008-226511 | 9/2008 |
| JP | 2011-182623 | 9/2011 |
| JP | 2014-161211 | 9/2014 |

OTHER PUBLICATIONS

International Search Report of PCT application No. PCT/JP2018/047168 dated Mar. 19, 2019.

*Primary Examiner* — Arun C Williams
(74) *Attorney, Agent, or Firm* — McDermott Will and Emery LLP (57) ABSTRACT

A power storage unit is configured with a plurality of cell strings (St1, St2, St3), where the cell strings are parallel-connected, and each cell string (St1, St2, St3) is constituted by a plurality of series-connected cells (E111 to E1*nn*, E211 to E2*nn*, E311 to E3*nn*). Voltage detector (111 to 13*n*) detects a voltage of each of the plurality of cell strings (St1, St2, St3). A plurality of switches (S1, S2, S3) are respectively inserted in the plurality of cell strings (St1, St2, St3). Management unit (20) performs, in a non-running state of vehicle (2) that power supply system (1) is mounted on, an equalization process to equalize a voltage and/or capacity between the plurality of cell strings (St1, St2, St3) by turning on at least two of the plurality of switches (S1, S2, S3).

7 Claims, 8 Drawing Sheets

(56) References Cited

U.S. PATENT DOCUMENTS

| | | | | |
|---|---|---|---|---|
| 8,614,871 B2* | 12/2013 | Takeda | ............... | G01R 31/3835 |
| | | | | 361/91.4 |
| 2001/0054877 A1* | 12/2001 | Kinoshita | ............. | H02J 7/0014 |
| | | | | 320/112 |
| 2006/0092583 A1* | 5/2006 | Alahmad | .............. | H02J 7/0024 |
| | | | | 361/15 |
| 2009/0134851 A1* | 5/2009 | Takeda | .................... | H02M 3/07 |
| | | | | 323/234 |
| 2012/0262121 A1* | 10/2012 | Kuo | ...................... | H02J 7/0019 |
| | | | | 320/126 |
| 2012/0286578 A1* | 11/2012 | Uno | ...................... | H02J 7/0024 |
| | | | | 307/77 |
| 2012/0313439 A1 | 12/2012 | Yamaguchi et al. | | |
| 2012/0326671 A1* | 12/2012 | Krause | ................ | H01M 10/441 |
| | | | | 320/126 |
| 2014/0203812 A1 | 7/2014 | Michinaga et al. | | |
| 2015/0244190 A1* | 8/2015 | Yamamoto | ............ | H02J 7/0014 |
| | | | | 320/126 |
| 2018/0099579 A1* | 4/2018 | Hale | ....................... | G05F 1/462 |

\* cited by examiner

VEHICULAR POWER SUPPLY SYSTEM, AND MANAGEMENT DEVICE

CROSS-REFERENCE TO RELATED APPLICATIONS

This application is a U.S. national stage application of the PCT International Application No. PCT/JP2018/047168 filed on Dec. 21, 2018, which claims the benefit of foreign priority of Japanese patent application 2018-013406 filed on Jan. 30, 2018, the contents all of which are incorporated herein by reference.

TECHNICAL FIELD

The present invention relates to a vehicular power supply system equipped with a power storage unit in which a plurality of cells are connected in a multiple series-parallel connection manner, and relates to a management device.

BACKGROUND ART

In recent years, hybrid vehicles (HVs), plug-in hybrid vehicles (PHVs), and electric vehicles (EVs) have been widely spreading. These vehicles are mounted with a secondary battery as a key device. Examples of vehicular secondary battery mainly include a nickel-metal-hydride battery and a lithium-ion battery. It is expected that the lithium-ion battery, which has high energy density, is spreading in an accelerated rate in the future.

A vehicular power storage unit generally has a connection form in which many parallel cells each configured with a plurality of parallel-connected cells are series-connected. In contrast, in the present specification, a connection form is employed in which many cell strings each configured with a plurality of series-connected cells are parallel-connected. In the case of the former connection form, if an abnormality occurs in a part of a current path configured in series connection, the power storage unit cannot be used at all. However, in the case of the latter connection form, even if an abnormality occurs in a part of the cell strings, the other cell strings can be continuously used. Because no internal-combustion engine is mounted on pure EVs, the pure EVs cannot run when a power storage unit cannot be used. In this point of view, the latter connection form can be a more robust vehicular power supply system.

In the configuration in which a plurality of cell strings are parallel-connected, there is a possibility that a voltage variation occurs between the cell strings, depending on individual differences and environmental conditions. If the vehicular power supply system is started up in a state where the voltage variation is left between the cell strings as it is, there is a possibility that excessive current will flow between the cell strings, thereby causing deterioration of cells.

As a method for equalizing voltages of a plurality of parallel-connected cell strings, the following methods can be considered, for example: a method in which charge stop timings for cell strings at the time of charging are individually controlled (for example, see PTL 1); and a method in which discharge start timings for cell strings are individually controlled at the time of discharge.

CITATION LIST

Patent Literature

PTL 1: Unexamined Japanese Patent Publication No. 2008-226511

SUMMARY OF THE INVENTION

In the former method for equalizing voltages at the time of charging, if a vehicle is left unused for a long period without being connected to a charger, the possibility is not denied that a voltage variation between the cell strings will occur when the vehicular power supply system is started up. Alternatively, in the method for equalizing voltages at the time of discharge, there is a possibility that a drive current for a motor will be insufficient when the EV starts running.

The present invention has been conceived in view of the above circumferences, and an object of the present invention is to provide a method that can equalize the voltages of the parallel-connected cell strings at an arbitrary timing.

To solve the above issue, a vehicular power supply system of an aspect of the present invention includes: a power storage unit having a plurality of cell strings, where the cell strings are parallel-connected and each cell string is constituted by a plurality of series-connected cells; a voltage detector that detects a voltage of each of the plurality of cell strings; a plurality of switches respectively inserted in the plurality of cell strings; and a management unit that performs, in a non-running state of a vehicle on which the power supply system is mounted, an equalization process to equalize a voltage and/or capacity between the plurality of cell strings by turning on at least two of the plurality of switches.

With the present invention, it is possible to equalize the voltages of the parallel-connected cell strings at arbitrary timing.

DESCRIPTION OF EMBODIMENT

Figure 1:
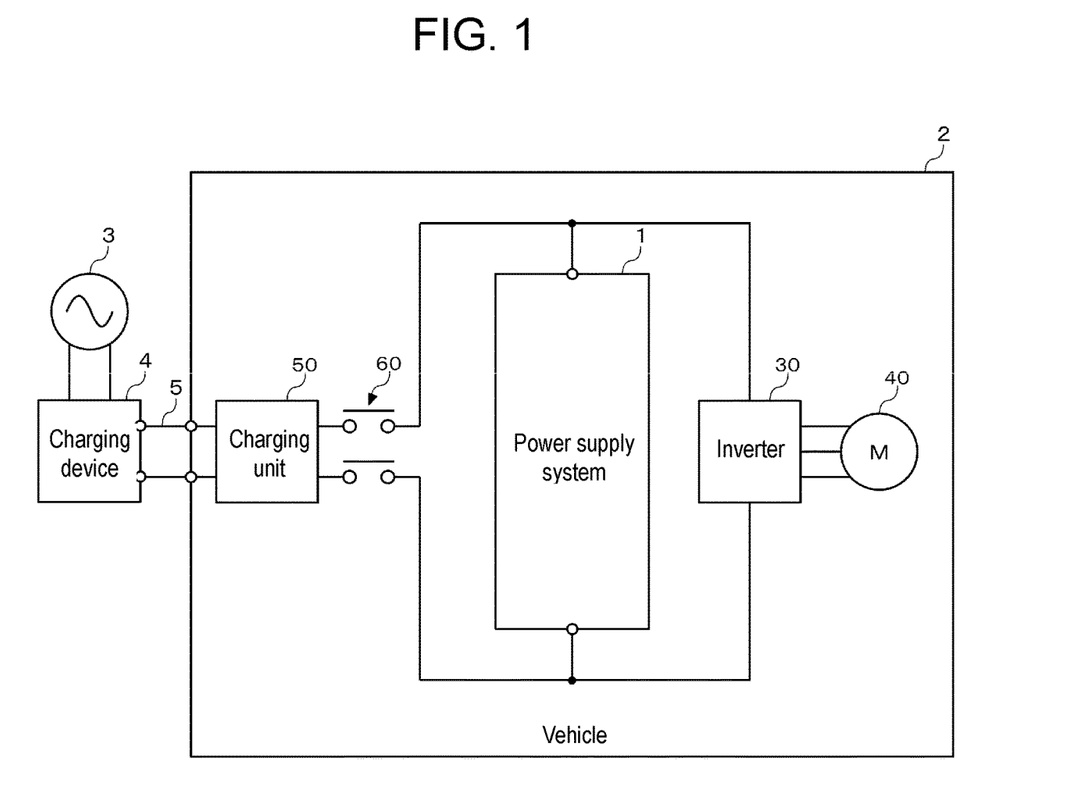
FIG. 1 is a diagram for describing a vehicle mounted with a power supply system according to an exemplary embodiment of the present invention.

FIG. 1 is a diagram for describing vehicle 2 mounted with power supply system 1 according to an exemplary embodiment of the present invention. In the present exemplary embodiment, an electric vehicle (EV) chargeable from a commercial power system (hereinafter, simply referred to as system 3) is assumed as vehicle 2.

Vehicle 2 is equipped with power supply system 1, inverter 30, motor 40, charging unit 50, and external charge switch 60. At the time of power running, inverter 30 converts direct current (DC) power supplied from power supply system 1 to alternate current (AC) power and supplies the AC power to motor 40. At the time of regeneration, inverter 30 converts AC power supplied from motor 40 to DC power and supplies the DC power to power supply system 1. At the time of power running, motor 40 rotates depending on the AC power supplied from inverter 30. At the time of regeneration, motor 40 converts rotation energy due to deceleration to AC power and supplies the AC power to inverter 30.

Power supply system 1 can be charged from charging device 4 installed outside vehicle 2. Charging device 4 and vehicle 2 are connected to each other with charging cables 5. Inside vehicle 2, power feed lines connected to charging cables 5 are connected to charging unit 50. Charging unit 50 is connected to power supply system 1 through external charge switch 60 and charges power supply system 1 with electric power supplied from charging device 4. As external charge switch 60, a relay or a semiconductor switch can be used, for example.

Charging device 4 is installed in homes, car dealers, rest areas, commercial facilities, public facilities, and other places. Charging device 4 is connected to system 3 and supplies single-phase AC power of AC 100 V or 200 V to vehicle 2 through charging cables 5. Note that, if charging is performed with low current of AC 100 V, a plug of charging cables 5 may be directly plugged into a home outlet without providing charging device 4.

Figure 2:
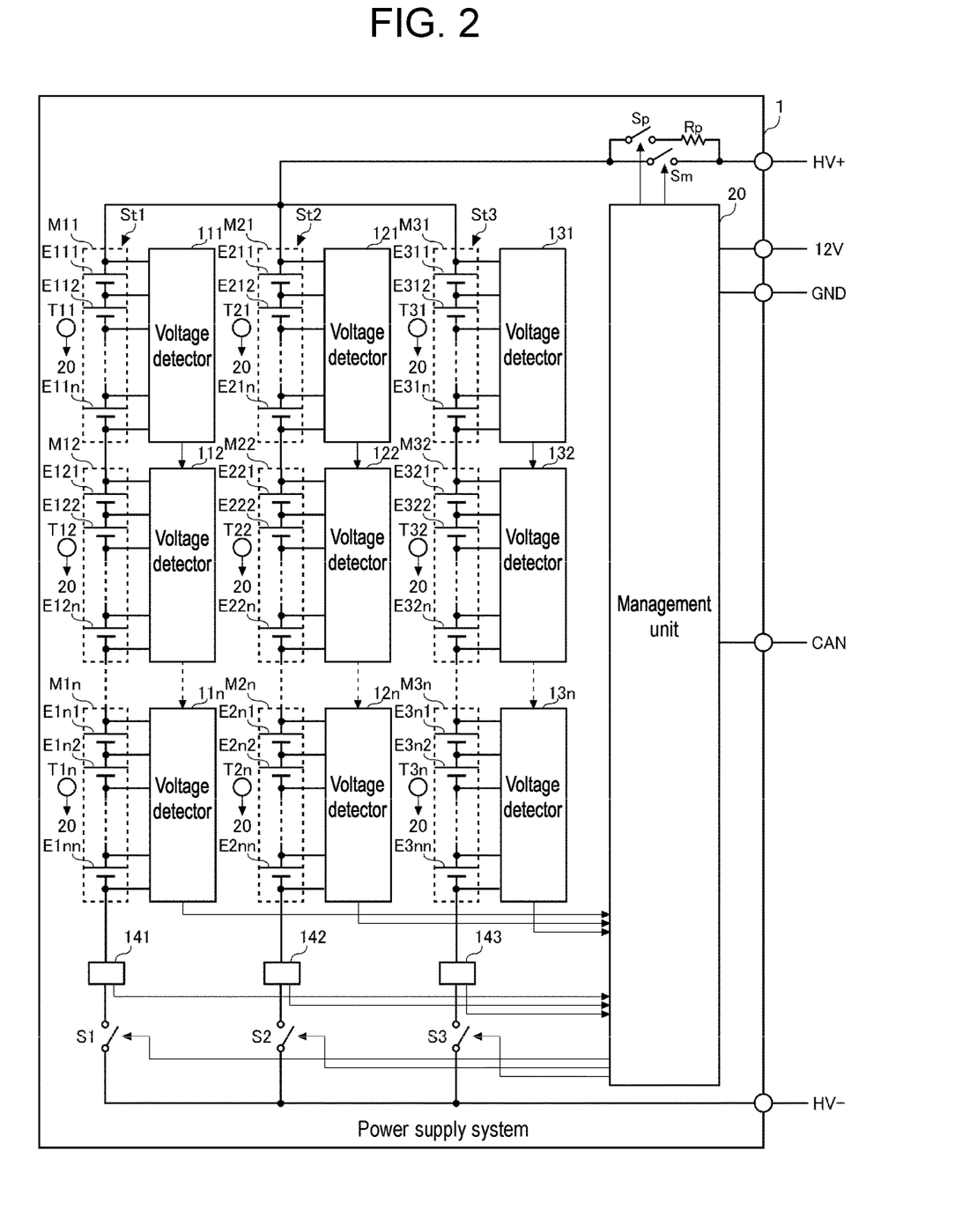
FIG. 2 is a diagram showing a configuration of the power supply system according to the exemplary embodiment of the present invention.

FIG. 2 is a diagram showing a configuration of power supply system 1 according to the exemplary embodiment of the present invention. The power storage unit mounted in power supply system 1 is configured such that a plurality of cell strings each constituted by a plurality of series-connected cells are parallel-connected. FIG. 2 shows an example in which three cell strings St1 to St3 are parallel-connected. First cell string St1 is configured such that a plurality of power storage modules M11, M12, ..., M1$n$ are series-connected. Power storage modules M11, M12, ..., M1$n$ respectively include a plurality of series-connected cells E111 to E11$n$, E121 to E12$n$, ..., E1$n$1 to E1$nn$. Second cell string St and third cell string St3 also have a similar configuration to first cell string St1.

Examples of the cells include lithium-ion battery cells, nickel-metal-hydride battery cells, lead battery cells, electric double-layer capacitor cells, lithium ion capacitor cells, or other types of cells. Hereinafter, the present specification assumes an example in which lithium-ion battery cells (nominal voltage: 3.6 V to 3.7 V) are used. The number of the series connected cells constituting each cell string St1 to St3 is determined depending on a drive voltage of motor 40. For example, when the drive voltage of motor 40 is about 400 V, about 100 cells of lithium-ion batteries need to be series-connected.

In the plurality of cell strings St1 to St3, current sensors 141 to 143 are respectively inserted in a series connection manner. Current sensors 141 to 143 respectively detect currents flowing through cell strings St1 to St3 and outputs the detected currents to management unit 20. Current sensors 141 to 143 can be each configured, for example, such that a shunt resistor or a hole element is combined with an amplifier.

The plurality of power storage modules M11 to M3$n$ are respectively provided with voltage detectors 111 to 13$n$. Voltage detector 111 is connected to each node of the plurality of series-connected cells E111 to E1$nn$ with a plurality of voltage lines and detects a voltage of each cell E111 to E1$nn$ by detecting a voltage between each two neighboring voltage lines. Voltage detector 111 can be configured with, for example, an ASIC (Application Specific Integrated Circuit). Voltage detector 111 includes a multiplexer and an A/D converter. The multiplexer outputs each voltage value of the plurality of cells E111 to E1$nn$ to the A/D converter in a predetermined order, and the A/D converter converts the voltage value in an analogue signal having been input from the multiplexer to a voltage value in a digital signal.

The plurality of voltage detectors 111 to 11$n$ that detect the voltages of the plurality of cells E111 to E1$nn$ constituting first cell string St1 are daisy-chain connected to management unit 20 through a communication line. The plurality of voltage detectors 111 to 11$n$ are connected to management unit 20 via an insulated circuit such as a photocoupler. That is because electric power for the plurality of voltage detectors 111 to 11$n$ is supplied from each of the plurality of power storage modules M11 to M1$n$ and electric power for management unit 20 is supplied from an auxiliary battery (generally, 12 volt lead battery) in vehicle 2.

The connection form of a plurality of voltage detectors 121 to 12$n$ to detect the voltages of the plurality of cells E211 to E2$nn$ constituting second cell string St2 and the connection form of the plurality of voltage detectors 131 to 13$n$ to detect the voltages of the plurality of cells E311 to E3$nn$ constituting third cell string St3 are also similar to the connection form of the plurality of voltage detectors 111 to 11$n$ to detect the voltages of the plurality of cells E111 to E1$nn$ constituting first cell string St1.

To detect temperature of each of the plurality of cells E111 to E3$nn$ constituting the power storage unit, a plurality of temperature sensors T11 to T3$n$ are provided. As temperature sensors T11 to T3$n$, thermistors can be used, for example. As more temperature sensors are provided, the temperatures of the plurality of cells E111 to E3$nn$ can be more accurately estimated. Although, to make the drawing simple, FIG. 2 shows an example in which one temperature sensor T11 to T3$n$ is provided for each one of power storage modules M11 to M3$n$, a plurality of temperature sensors are preferably provided for each one of power storage modules M11 to M3$n$. Each of the plurality of temperature sensors T11 to T3$n$ outputs the detected temperature to management unit 20.

Positive sides of a plurality of cell strings St1 to St3 are joined together into one current path and are then connected to a positive-side high-voltage line HV+, which is connected to inverter 30, through main switch Sm. Series-connected pre-charge switch Sp and pre-charge resistor Rp are parallelly connected to main switch Sm. As main switch Sm and pre-charge switch Sp, relays or a semiconductor switches can be used, for example.

When the power storage unit and inverter 30 are electrically connected, pre-charge switch Sp is previously turned on. Thus, a capacity on a load side can be pre-charged with a current limited by pre-charge resistor Rp. Main switch Sm is then turned on, so that a rush current to the load can be reduced. After main switch Sm is turned on, pre-charge switch Sp is turned off to eliminate power consumption by pre-charge resistor Rp.

On negative sides of the plurality of cell strings St1 to St3, a plurality of string switches S1 to S3 are inserted in series, respectively. The negative sides of the plurality of cell strings St1 to St3 are joined together into one current path after passing through the plurality of string switches S1 to S3. The current path, to which the negative sides are joined, is connected to a negative-side high-voltage line HV-connected to inverter 30. Also as the plurality of string switches S1 to S3, relays or semiconductor switches can be used, for example.

Management unit 20 can be configured with, for example, a microprocessor. Management unit 20 manages the whole of power supply system 1 on the basis of the voltages, currents, and temperatures of the plurality of cells E111 to E3nn detected by voltage detectors 111 to 13n, current sensors 141 to 143, and temperature sensors T11 to T3n. As described above, management unit 20 operates by electric power supplied from the auxiliary battery in vehicle 2. Management unit 20 communicates with a higher-level electronic control unit (ECU) of vehicle 2 through an in-vehicle network such as controller area network (CAN).

Management unit 20 estimates states of charge (SOCs) and states of health (SOHs) of the plurality of cells E111 to E3nn. The SOC can be estimated by, for example, an open circuit voltage (OCV) method or a current integration method. The OCV method is a method in which the SOC is estimated based on the OCVs detected by voltage detectors 111 to 13n and based on characteristic data of an SOC-OCV curve. The current integration method is a method in which the SOC is estimated based on the OCVs detected by voltage detectors 111 to 13n at the time of starting charge and discharge and based on integrated values of currents detected by current sensors 141 to 143.

The SOH is specified by a ratio of present full charge capacity to an initial full charge capacity. This numerical value decreases (approaches 0%) as degradation progresses. The SOH can be estimated based on a correlation with an internal resistance. The internal resistance can be estimated by dividing a voltage drop occurring when a predetermined current flows through a battery for a predetermined time by the predetermined current. The internal resistance has a relationship that the internal resistance decreases as the temperature rises and that the internal resistance increases as the battery becomes deteriorated. The degradation of the battery progresses as the number of charge and discharge cycles increases. Further, the degradation of the battery depends also on individual differences and usage environments. Therefore, basically, variation of capacity between the plurality of cells E111 to E3nn increases as the cells are used longer.

Management unit 20 performs an equalization process between each of the plurality of series-connected cells E111 to E1nn, E211 to E2nn, E311 to E3nn. Note that FIG. 2 does not show a discharge circuit for performing an equalization process of the cells for the sake of simplicity of the drawing. Actually, to both ends of each of cells E111 to 3nn, a discharge circuit for equalization is connected.

Figure 3:
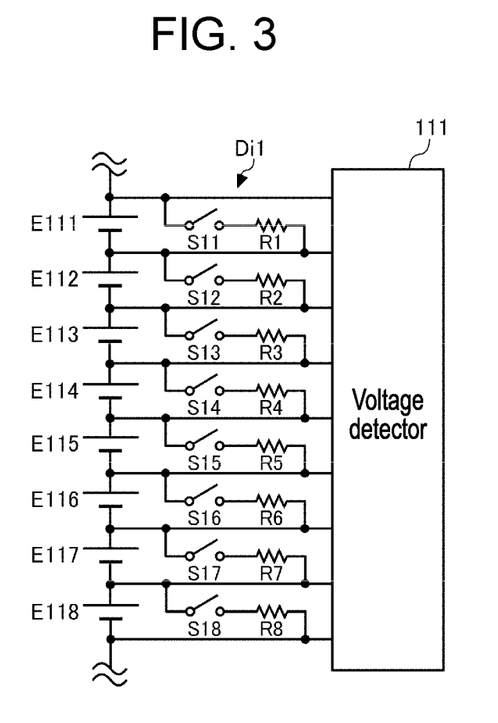
FIG. 3 is a diagram showing a configuration example of a discharge circuit for a plurality of cells included in a power storage module.

FIG. 3 is a diagram showing a configuration example of discharge circuit Di1 for the plurality of cells E111 to E118 included in power storage module M11. In the example shown in FIG. 3, one power storage module M11 is configured with eight series-connected cells E111 to E118. To both ends of cell E111, series-connected discharge switch S11 and discharge resistor R1 are parallel-connected. The other cells E112 to E118 have a similar configuration. Further, cells E121 to E3nn included in the other power storage modules M12 to M3n have a similar configuration.

The capacities of the plurality of cells E111 to E inn constituting first cell string St1 vary depending on time degradation and usage environments. For example, when there is a temperature variation occurring between the plurality of cells E111 to E inn, their capacities vary. To address this variation, management unit 20 performs the equalization process between the plurality of cells E111 to E1nn. In the equalization process (passive balancing) by discharge, the cell, of the plurality of cells E111 to E inn, having the smallest capacity is targeted, and the other cells are made to have the same capacity as the targeted cell.

Management unit 20 determines a discharge time for each of the other cells to make the other cells have the same capacity as the cell having the smallest capacity. Management unit 20 determines the discharge time for each of the other cells, on the basis of discharge capacity based on the difference between the current capacity of each of the cells and an equalization target capacity and on the basis of a resistance value of the discharge resistor. Management unit 20 controls the discharge switch of each of the other plurality of cells on the basis of each of the determined discharge times. Note that it is possible to estimate the capacity of each of cells E111 to E inn on the basis of the OCV detected by voltage detector 111. Management unit 20 performs the equalization process also on second cell string St2 and third cell string St3 similarly to the case of first cell string St1.

In the present exemplary embodiment, in addition to the equalization process between cells, the equalization process is also performed between strings. In a non-running state of vehicle 2, management unit 20 can equalize a voltage and/or capacity between the plurality of cell strings St1 to St3 by turning on two or more of the plurality of string switches S1 to S3.

Figure 4:
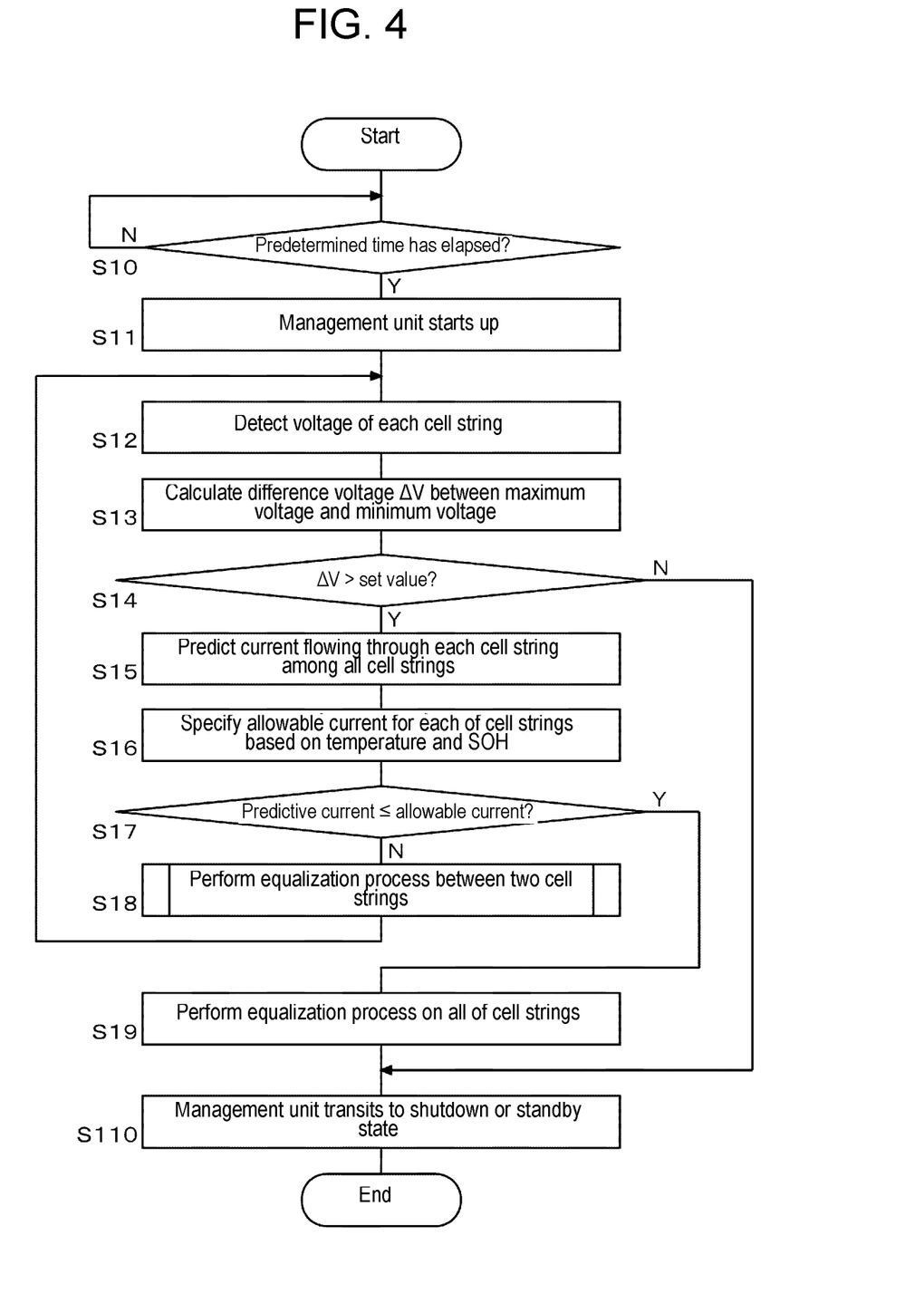
FIG. 4 is a flowchart for describing a first example of an equalization process between cell strings.

FIG. 4 is a flowchart for describing a first example of the equalization process between the cell strings. In the first example, it is assumed that vehicle 2 is in a parking state and that charging device 4 is in a state of not charging. That is, it is assumed that vehicle 2 is in a power-off state (an ignition-off state of an engine vehicle). Management unit 20 is equipped with a regular (or periodical) startup function.

When a predetermined time has elapsed since vehicle 2 was powered off or since the previous startup was performed (for example, several hours) (step S10: Y), management unit 20 starts up from a shutdown or standby state (step S11). Management unit 20 detects the voltage of each cell string St1, St2, St3 on the basis of the voltage values obtained from the plurality of voltage detectors 111 to 13n (step S12). The voltage of each cell string St1, St2, St3 is obtained by adding the voltages of cells E111 to inn, E211 to 2nn, E311 to 3nn respectively constituting cell strings St1, St2, St3. Note that a voltage detection circuit may be separately provided to detect a voltage between the both ends of each cell string St1, St2, St3.

Management unit 20 calculates a difference voltage ΔV between a maximum voltage and a minimum voltage of the respective voltages of cell strings St1, St2, St3 (step S13). Management unit 20 compares the calculated difference voltage ΔV with a set value (step S14). The set value is set to a maximum allowable value of the voltage variation between the cell strings. The maximum allowable value is set by a designer, considering a damage to cell E111 to 3nn when a voltage variation occurs, measurement errors of voltage detectors 111 to 13n, and the like.

If the difference voltage ΔV is higher than the set value (step S14: Y), management unit 20 predicts a current flowing through each cell string St1, St2, St3 of all cell strings St1 to St3 (step S15).

Management unit 20 specifies the allowable current for each of cell strings St1, St2, St3 on the basis of the temperature and the SOHs of cells E111 to 3nn included in each of cell strings St1, St2, St3 (step S16). Management unit 20 specifies the cell having the minimum allowable current in each cell string and sets the allowable current of the cell having the minimum allowable current as the allowable current for each of cell strings St1, St2, St3. There is a relationship that the allowable current of a cell is lower as the temperature is lower and that the allowable current is lower as the SOH is lower. Management unit 20 can specifies the allowable current of a cell on the basis of the current-temperature characteristics and the current-SOH characteristics of the cell that management unit 20 have.

Management unit 20 respectively compares the predictive currents flowing through cell strings St1, St2, St3 with the allowable currents of cell strings St1, St2, St3 (step S17). The predictive current is less than or equal to the allowable current for all of cell strings St1 to St3 (step S17: Y), management unit 20 performs the equalization process on all of the plurality of cell strings St1 to St3 while turning on all of the plurality of string switches S1 to S3 (step S19). When the difference voltage ΔV between the maximum voltage and the minimum voltage becomes less than or equal to a predetermined value or when the current values detected by current sensors 141 to 143 become less than or equal to a predetermined value, management unit 20 finishes the equalization process between the cell strings by turning off the plurality of string switches S1 to S3. When the equalization process is finished, management unit 20 transits to the shutdown or standby state (step S110).

In the above step S14, if the difference voltage ΔV between the maximum voltage and the minimum voltage is less than or equal to the set value (step S14: N), there is no need for the equalization process between the plurality of cell strings St1 to St3, and the flow therefore goes to step S110, so that management unit 20 immediately transitions to the shutdown or standby state (step S110).

In the above step S17, if there is a cell string whose predictive current is greater than the allowable current (step S17: N), management unit 20 performs the equalization process between two cell strings (step S18).

Figure 5:
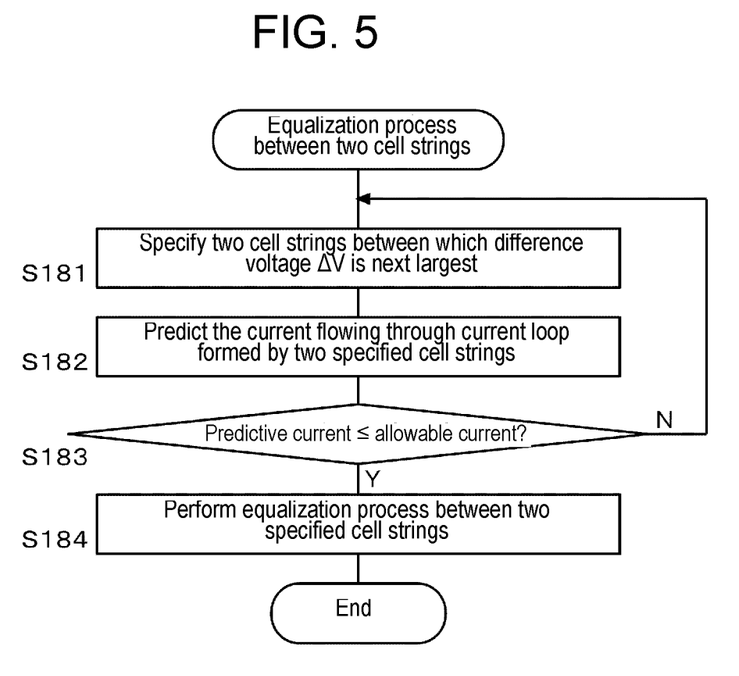
FIG. 5 is a flowchart showing details of Step S18 of FIG. 4.

FIG. 5 is a flowchart showing details of step S18 of FIG. 4. Management unit 20 specifies the two cell strings between which the difference voltage ΔV is the next largest on the basis of the detected voltage of each of cell strings St1, St2, St3 (step S181). For example, if the voltage of first cell string St1 is 400V, the voltage of the second cell string St2 is 390V, and the voltage of third cell string St3 is 370V, management unit 20 specifies the two cell strings, second cell string St2 and third cell string St3.

Management unit 20 predicts the current flowing through a current loop formed by the two specified cell strings (step S182). A circulating current Ic flowing through the current loop is predicted by the following Equation 1.

$$Ic = \Delta V / (R1 + R2) \quad \text{(Equation 1)}$$

where

R1 is a sum of internal resistances of the cells included in the cell string in which the maximum voltage is detected, and R2 is a sum of internal resistances of the cells included in the cell string in which the minimum voltage is detected.

As described above, there is a relationship that the internal resistance of a cell is higher as the temperature is lower and that the internal resistance is higher as the SOH is lower (as the deterioration proceeds).

Management unit 20 compares the predictive current to flow through the current loop with the allowable current of the current loop (step S183). If the predictive current is less than or equal to the allowable current (step S183: Y), management unit 20 performs the equalization process between the two cell strings by turning on the two string switches of the two cell strings (step S184). If the predictive current is greater than the allowable current (step S183: N), the flow transitions to step S181 to specify two new cell strings (step S181).

When the equalization process between the two cell strings shown in FIG. 5 is finished, the voltages of the two cell strings of the plurality of cell strings St1, St2, St3 are changed. In the above example, the voltages of second cell string St2 and third cell string St3 become to be 380 V. In association with this voltage change, a value of the difference voltage ΔV between the maximum voltage and the minimum voltage shown in step S13 of FIG. 4 becomes small. By the above process, the state becomes closer to the state where the plurality of cell strings St1, St2, St3 are entirely equalized.

Figure 6:
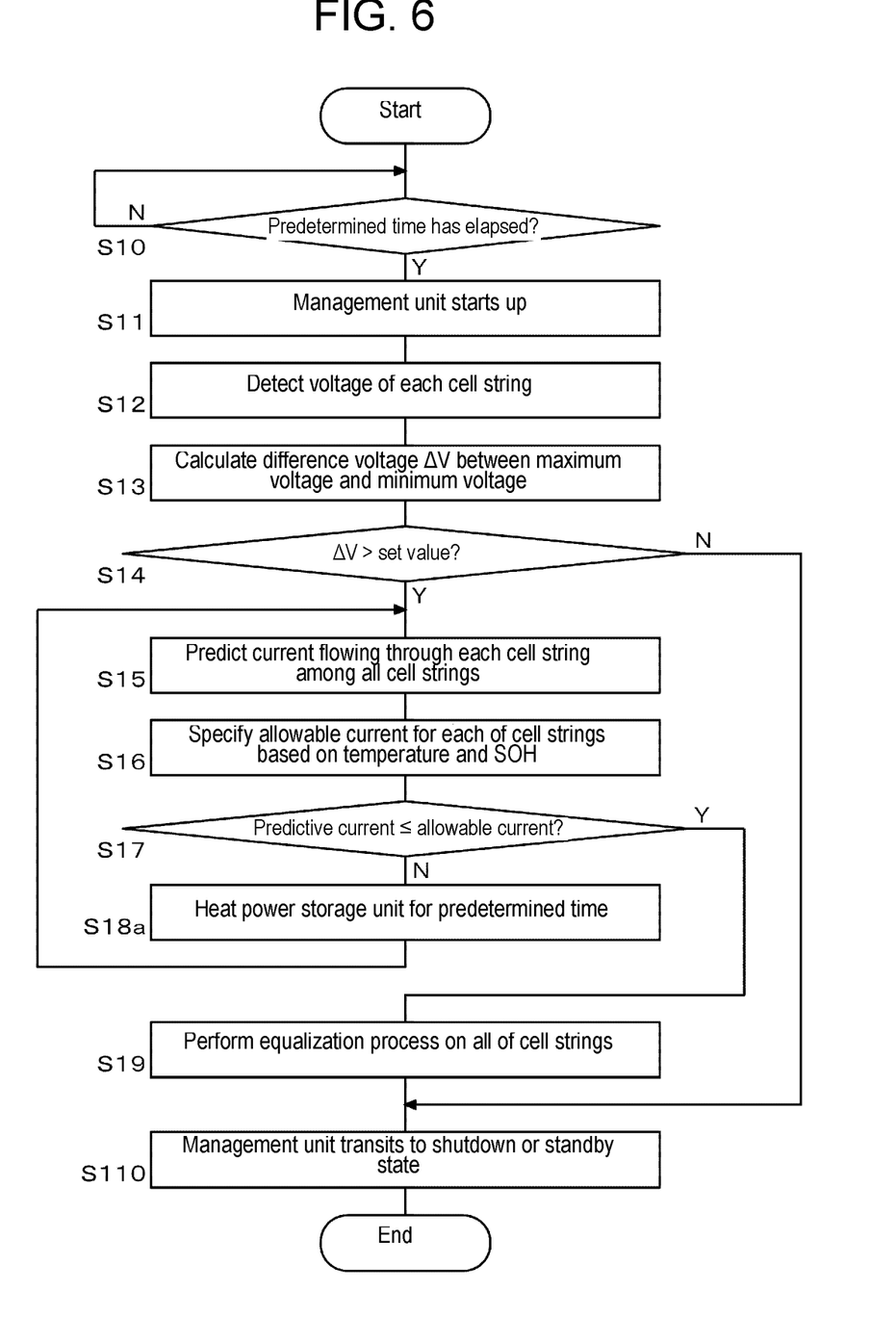
FIG. 6 is a flowchart for describing a second example of the equalization process between the cell strings.

FIG. 6 is a flowchart for describing a second example of the equalization process between the cell strings. In the second example, it is assumed that a heater for warming the power storage unit is equipped inside or outside power supply system 1. The processes of steps S10 to S17 and S19 to S110 is the same as the process of the flowchart according to the first example shown in FIG. 4. In the second example, if the predictive current is greater than the allowable current (step S17: N), management unit 20 make the heater operate to heat the power storage unit for a predetermined time (step S18a). Due to a rise in the temperature of the cells caused by the heating, the allowable currents of the cells in step S16 are increased, so that the predictive current becomes less than or equal to the allowable current in step S17 (step S17: Y).

Figure 7:
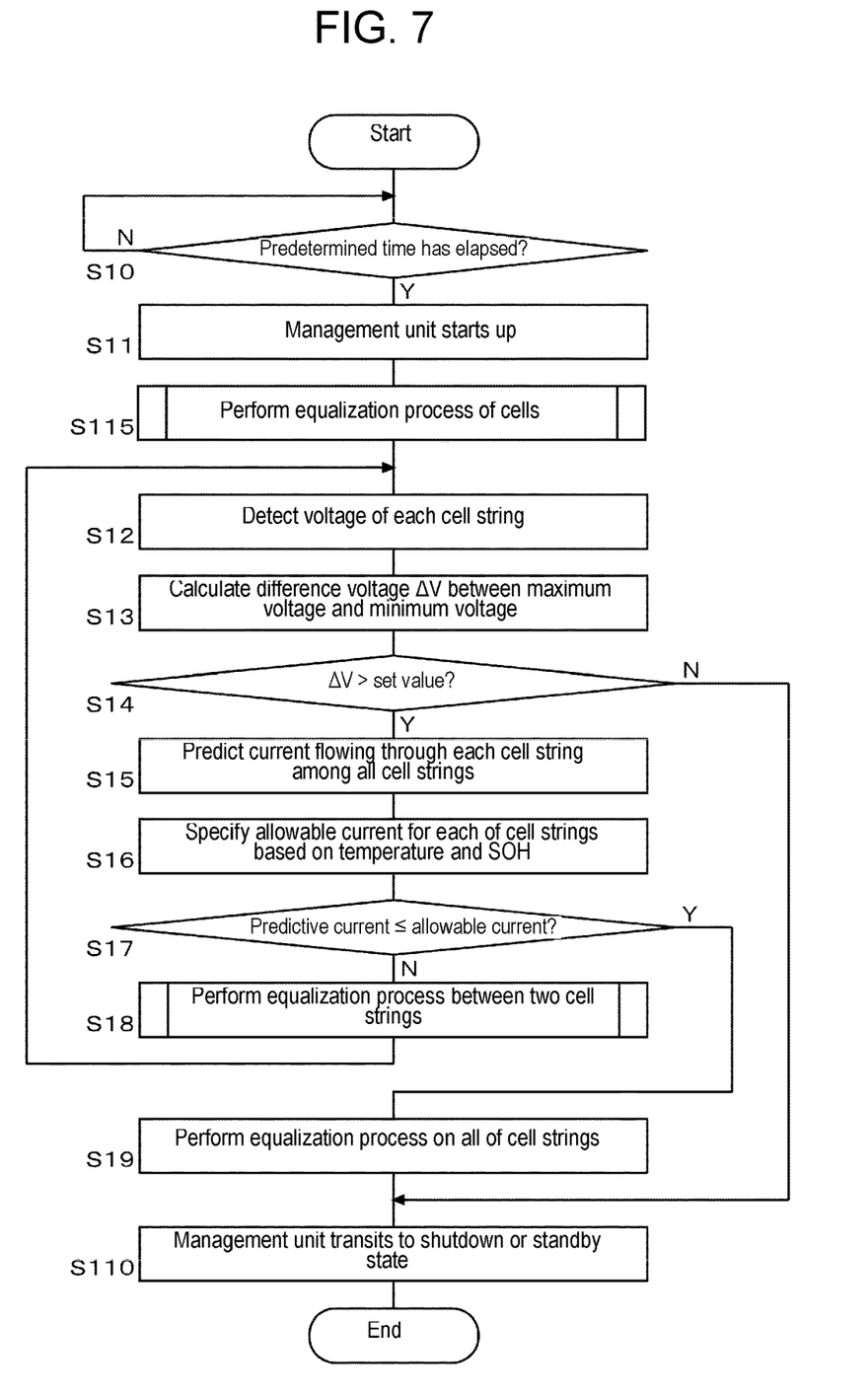
FIG. 7 is a flowchart for describing a third example of the equalization process between the cell strings.

FIG. 7 is a flowchart for describing a third example of the equalization process between the cell strings. Third example is an example in which the equalization process between the series-connected cells and the equalization process between the parallel-connected cell strings are performed at the same occasion.

When the predetermined time has elapsed since vehicle 2 was powered off or since the previous startup was performed (step S10: Y), management unit 20 starts up from the shutdown or standby state (step S11). Management unit 20 performs the equalization process between each of the plurality of series-connected cells E111 to E1nn, E211 to E2nn, E311 to E3nn on the basis of the voltage values of cells E111 to 3nn obtained from the plurality of voltage detectors 111 to 13n (step S115). After the equalization process between the cells is finished, management unit 20 performs the equalization process between parallel-connected cell strings (steps S11 to S110). To perform the equalization process between the cell strings, it is possible to use the equalization process according to the first example shown in FIG. 4 or the equalization process according to the second example shown in FIG. 5.

The equalization process between the parallel-connected cell strings is performed after the equalization process between the series-connected cells is finished. As described above, as the equalization process between the cells, a passive balancing method using discharge circuits is a mainstream. Since energy is consumed in the passive balancing method, a sum of the cell voltages after the equalization process is lower than the sum of the cell voltages before the equalization process. Further, an amount of the energy consumed by the equalization process depends on a degree of variation between the cell voltages. Therefore, if the equalization process between the cell strings is first performed and the equalization process between the cells are then performed, there is a possibility of occurrence of a variation in voltage between the cell strings due to the equalization process between the cells. Therefore, if the equalization process between the cell strings is performed before the equalization process between the cells, it is possible to maintain for a longer time a state where the voltages are the same between the cell strings.

Figure 8:
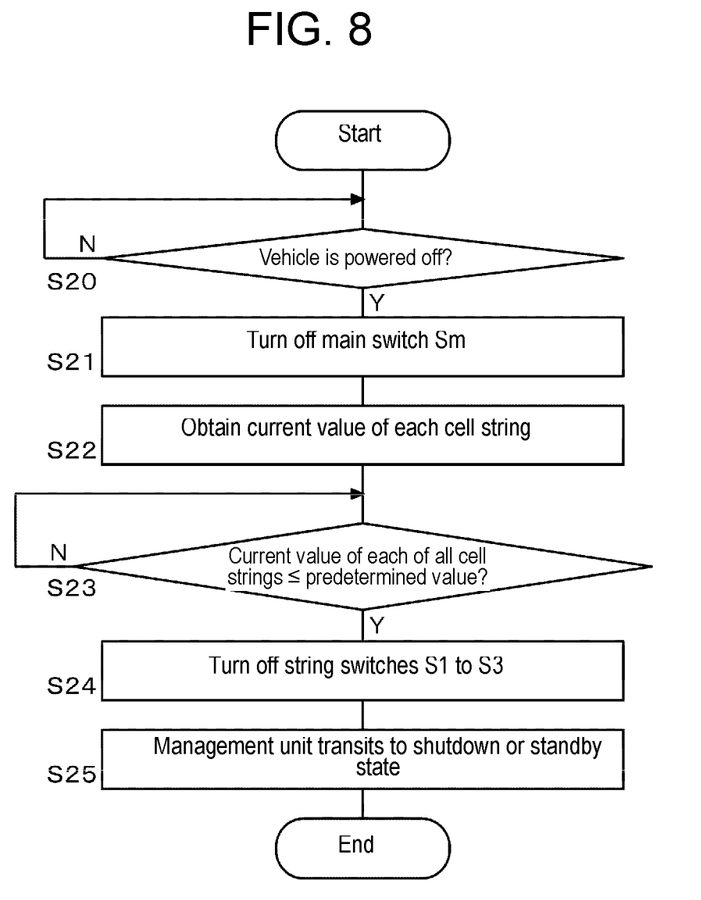
FIG. 8 is a flowchart for describing a fourth example of the equalization process between the cell strings.

FIG. 8 is a flowchart for describing a fourth example of the equalization process between the cell strings. The equalization process according to the fourth example is performed immediately after a driver performs an operation to power off vehicle 2 after end of running.

If vehicle 2 is powered off (step S20: Y), management unit 20 turns off main switch Sm (step S21). Management unit 20 obtains current values from the plurality of current sensors 141 to 143 while keeping the plurality of string switches S1 to S3 on (step S22). Management unit 20 compares the current value of each of all cell strings with a predetermined value (step S23). The predetermined value is set to zero or a value obtained by adding to zero a margin determined while considering measurement errors of current sensors 141 to 143 and the like.

If the current values of all the cell strings become less than the predetermined value (step S23: Y), management unit 20 turns off the plurality of string switches S1 to S3 (step S24). After that, management unit 20 transits to the shutdown or standby state (step S25). If there is a voltage difference occurring between the plurality of cell strings St1 to St3, a current flows from the cell string having a higher voltage to the cell string having a lower voltage (lateral flow). When the voltage difference between the plurality of cell strings St1 to St3 is removed, the lateral flow stops.

As described above, the present exemplary embodiment enables the voltages to be made the same between parallel-connected cell strings St1 to St3 at an arbitrary timing. The equalization process between cell strings St1 to St3 can be performed also in other states than a charging state where vehicle 2 is connected to charging device 4 or than a discharging state where power supply system 1 is connected to motor 40 through inverter 30. Therefore, the equalization process between cell strings St1 to St3 can be performed also when vehicle 2 is being parked, and is therefore possible to prevent an excessive amount of circulating current (lateral flow) from flowing between cell strings St1 to St3 when vehicle 2 is started up. As a result, it is possible to prevent deterioration of cells E111 to E3nn due to an overcurrent.

Further, the equalization process between cell strings St1 to St3 is performed by an active balancing method, and no useless energy consumption occurs. Further, management unit 20 does not monitor the voltages of the plurality of cell strings St1 to St3 but checks the voltages of cell strings St1 to St3 at a timing when management unit 20 regularly or periodically starts up. This prevents management unit 20 from being constantly active, and it is therefore possible to reduce power consumption of the auxiliary battery in vehicle 2. Further, by performing the equalization process between the cells and the equalization process between the strings are performed at the same occasion, it is possible to reduce the number of times of startup of management unit 20, thereby reducing increase of the power consumption of management unit 20.

In the above, the present invention has been described based on the exemplary embodiment. The above exemplary embodiment is merely an example, and the person of ordinary skill in the art will understand that various modifications can be made in the combination of configuration elements and the processes in the exemplary embodiment and that such modifications are also within the scope of the present invention.

For example, in step S19 of the first to third examples illustrate an example in which the equalization process between all of cell strings St1 to St3 is performed at a time; however, in one method, the equalization process between two cell strings may be performed in turn. Further, the flowchart in FIG. 5 illustrates an example in which the equalization process between the two cell strings between which the difference voltages $\Delta V$ is larger is preferentially performed. However, it is possible to preferentially perform the equalization process between the cell strings having smaller difference voltages $\Delta V$, or it is possible to randomly perform the equalization process between two arbitrary cell strings.

As described above, management unit 20 regularly starts up when vehicle 2 is being parked, and monitors the voltages of cell strings St1 to St3. If there is a difference between the voltage of a cell string at the previous startup and the voltage of the cell string at the current startup (the difference represents an amount of decrease) is greater than a threshold value, it can be considered that there is an abnormality in the cell string. For example, there is a possibility that a micro-short circuit is caused in a cell. In this case, management unit 20 notifies the above ECU of abnormality in the power storage unit through the in-vehicle network. Management unit 20 keeps the string switch corresponding to the cell string in which abnormality is supposed to be occurring in an off-state until the abnormality is resolved. Note that since the cell strings in which no abnormality is occurring are allowed to be used, it is possible to secure a power source with which vehicle moves to a car dealer or a garage by self-propelling.

Note that exemplary embodiment may be specified by the following items.

[Item 1]

Vehicular power supply system (1) including:

a power storage unit including a plurality of cell strings (St1, St2, St3), where the cell strings are parallel-connected, and each cell string (St1, St2, St3) is constituted by a plurality of series-connected cells (E111 to E inn, E211 to E2nn, E311 to E3nn);

voltage detector (111 to 13n) that detects a voltage of each of the plurality of cell strings (St1, St2, St3);

a plurality of switches (S1, S2, S3) respectively inserted in the plurality of cell strings (St1, St2, St3); and management unit (20) that performs, in a non-running state of vehicle (2) that power supply system (1) is mounted on, an equalization process to equalize a voltage and/or capacity between the plurality of cell strings (St1, St2, St3) by turning on at least two of the plurality of switches (S1, S2, S3).

This power supply system (1) enables an equalization process between a plurality of cell strings (St1, St2, St3) to be performed at an arbitrary timing.

[Item 2]

Vehicular power supply system (1) according to Item 1, in which, when vehicle (2) is being parked, management unit (20) regularly starts up and detects voltages of the plurality of cell strings (St1, St2, St3) based on the voltages detected by voltage detector (111 to 13n), and when a difference between a maximum voltage and a minimum voltage of the detected voltages of the plurality of cell strings (St1, St2, St3) is greater than a set value, management unit (20) performs the equalization process.

This power supply system (1) enables the equalization process between the plurality of cell strings (St1, St2, St3) to be performed also when vehicle (2) is being parked. Further, it is possible to reduce increase in a power consumption of management unit (20).

[Item 3]

Vehicular power supply system (1) according to Item 2, in which, when the difference between the maximum voltage and the minimum voltage is greater than the set value, management unit (20) predicts values of the currents flowing through all of the plurality of cell strings (St1, St2, St3), and when the predicted value of the current of each cell string (St St2, St3) is less than or equal to an allowable current of the each cell string (St St2, St3), the management unit turns on all of the plurality of switches (S1, S2, S3).

With this vehicular power supply system (1), it is possible to prevent a current greater than the allowable current from flowing through a cell by performing the equalization process between the plurality of cell strings (St St2, St3).

[Item 4]

Vehicular power supply system (1) recited Item 2 or Item 3, in which, when the difference between the maximum voltage and the minimum voltage is greater than the set value, management unit (20) predicts a value of a current flowing through each of the cell strings, and when the predicted value of the current of one of the cell strings is greater than the allowable current for the one of the cell strings and the predicted value of the current of another of the cell strings is not greater than the allowable current for the another of the cell strings, the management unit specifies two cell strings whose predicted values of the currents are not greater than the allowable currents for the specified two cell strings, and the management unit turns on the two switches inserted in the specified two cell strings.

With this vehicular power supply system (1), it is possible to prevent a current greater than an allowable current from flowing through a cell and, at the same time, it is possible to make the voltages of the plurality of cell strings (St1, St2, St3) closer to each other.

[Item 5]

Vehicular power supply system (1) according to Item 3 or Item 4, in which values of the allowable currents are set depending on temperatures and states of health (SOHs) of the cells.

This vehicular power supply system (1) enables optimum values of the allowable currents to be adaptively set.

[Item 6]

Vehicular power supply system (1) according to any one of Items 1 to 5, in which voltage detector (111 to 13n) detects voltages of the plurality of cells (E111 to E1nn, E211 to E2nn, E311 to E3nn) included in each of the plurality of cell strings (St1, St2, St3), and management unit (20) regularly starts up when the vehicle (2) is being parked and performs an equalization process between the plurality of cells (E111 to E1nn, E211 to E2nn, E311 to E3nn) of each of the plurality of cell strings (St1, St2, St3), and after the equalization processes are completed on the cells, the management unit (20) performs the equalization process between the plurality of cell strings (St1, St2, St3).

With this vehicular power supply system (1), it is possible to efficiently perform the equalization process between cells (E111 to E1nn, E211 to E2nn, E311 to E3nn) and between cell strings (St1, St2, St3).

[Item 7]

Vehicular power supply system (1) according to any one of Items 1 to 6, further including a current detector (141, 142, 143) that detects a current flowing through each of the plurality of cell strings (St1, St2, St3), in which when vehicle (2) transitions to a parking state where power supply system (1) and a load (30) in vehicle (2) are electrically separated from each other, management unit (20) turns off the plurality of switches (S1, S2, S3) after values of the currents detected by the current detector (141, 142, 143) become less than or equal to a predetermined value.

With this vehicular power supply system (1), the parking state can be started in a state where the voltages are the same between the plurality of cell strings (St1, St2, St3).

[Item 8]

Management device (20) that manages vehicular power supply system (1), where vehicular power supply system (1) includes: a power storage unit having a plurality of cell strings (St1, St2, St3), where cell strings (St1, St2, St3) are parallel-connected to each other and each cell string (St1, St2, St3) is constituted by a plurality of series-connected cells (E111 to E1nn, E211 to E2nn, E311 to E3nn); voltage detector (111 to 13n) that detects voltage of each of the plurality of cell strings; and a plurality of switches (S1, S2, S3) respectively inserted in the plurality of cell strings (St1, St2, St3), where management device (20) performs, while vehicle (2) that power supply system (1) is mounted on is not running, an equalization process to equalize a voltage and/or capacity between the plurality of cell strings (St1, St2, St3) by turning on at least two of the plurality of switches (S1, S2, S3).

This management unit (20) enables an equalization process between a plurality of cell strings (St1, St2, St3) to be performed at an arbitrary timing.

The invention claimed is:

1. A vehicular power supply system comprising:
   a power storage unit including a plurality of cell strings, the plurality of cell strings being parallel-connected and being each constituted by a plurality of series-connected cells;
   a voltage detector that detects a voltage of each of the plurality of cell strings;
   a plurality of switches respectively inserted in the plurality of cell strings; and
   a management unit that performs, in a non-running state of a vehicle that the power supply system is mounted on, an equalization process to equalize a voltage and/or capacity between the plurality of cell strings by turning on at least two of the plurality of switches,
   wherein, when the vehicle is being parked, the management unit regularly starts up and detects voltages of the plurality of cell strings based on the voltages detected by the voltage detector, and when a difference between a maximum voltage and a minimum voltage of the detected voltages of the plurality of cell strings is greater than a set value, the management unit performs the equalization process.

2. The vehicular power supply system according to claim 1, wherein when the difference between the maximum voltage and the minimum voltage is greater than the set value, the management unit predicts values of the currents flowing through all of the plurality of cell strings, and when the predicted value of the current of each of the plurality of cell strings is less than or equal to an allowable current of each of the plurality of cell string, the management unit turns on all of the plurality of switches.

3. The vehicular power supply system according to claim 1, wherein when the difference between the maximum voltage and the minimum voltage is greater than the set value, the management unit predicts a value of a current flowing through each of the cell strings, and when the predicted value of the current of one of the cell strings is greater than the allowable current for the one of the plurality of cell strings and the predicted value of the current of another of the cell strings is not greater than the allowable current for the another of the cell strings, the management unit specifies two of the plurality of cell strings whose predicted values of the currents are not greater than the allowable currents for the specified two of the plurality of cell strings, and the management unit turns on the two switches inserted in the specified two of the plurality of cell strings.

4. The vehicular power supply system according to claim 2, wherein values of the allowable currents are set depending on temperatures and states of health (SOHs) of the plurality of cells.

5. A vehicular power supply system comprising:
a power storage unit including a plurality of cell strings, the plurality of cell strings being parallel-connected and being each constituted by a plurality of series-connected cells;
a voltage detector that detects a voltage of each of the plurality of cell strings;
a plurality of switches respectively inserted in the plurality of cell strings; and
a management unit that performs, in a non-running state of a vehicle that the power supply system is mounted on, an equalization process to equalize a voltage and/or capacity between the plurality of cell strings by turning on at least two of the plurality of switches,
wherein the voltage detector detects voltages of the plurality of cells included in each of the plurality of cell strings, and
the management unit regularly starts up when the vehicle is being parked and performs an equalization process between the plurality of cells of each of the plurality of cell strings, and after the equalization processes are completed on the cells, the management unit performs the equalization process between the plurality of cell strings.

6. A vehicular power supply system comprising:
a power storage unit including a plurality of cell strings, the plurality of cell strings being parallel-connected and being each constituted by a plurality of series-connected cells;
a voltage detector that detects a voltage of each of the plurality of cell strings;
a plurality of switches respectively inserted in the plurality of cell strings;
a management unit that performs, in a non-running state of a vehicle that the power supply system is mounted on, an equalization process to equalize a voltage and/or capacity between the plurality of cell strings by turning on at least two of the plurality of switches; and
a current detector that detects a current flowing through each of the plurality of cell strings,
wherein when the vehicle transitions to a parking state where the power supply system and a load in the vehicle are electrically separated from each other, the management unit turns off the plurality of switches after values of the currents detected by the current detector become less than or equal to a predetermined value.

7. A management device for managing a vehicular power supply system, wherein the vehicular power supply system includes: a power storage unit including a plurality of cell strings, the plurality of cell strings being parallel-connected to each other and being constituted by a plurality of series-connected cells; a voltage detector that detects a voltage of each of the plurality of cell strings; and a plurality of switches respectively inserted in the plurality of cell strings,
wherein the management device performs, while a vehicle that the power supply system is mounted on is not running, an equalization process to equalize a voltage and/or capacity between the plurality of cell strings by turning on at least two of the plurality of switches, and
wherein, when the vehicle is being parked, the management device regularly starts up and detects voltages of the plurality of cell strings based on the voltages detected by the voltage detector, and when a difference between a maximum voltage and a minimum voltage of the detected voltages of the plurality of cell strings is greater than a set value, the management device performs the equalization process.

\* \* \* \* \*